Oct. 27, 1959   V. F. FISHTAHLER ET AL   2,910,147
HIGH-LOW BRAKE PEDAL LINKAGE

Filed April 4, 1955   3 Sheets-Sheet 1

INVENTORS
VERNON F. FISHTAHLER
WILLIAM W. VINCENT

Craig V. Morton
ATTORNEY

Oct. 27, 1959 V. F. FISHTAHLER ET AL 2,910,147
HIGH-LOW BRAKE PEDAL LINKAGE
Filed April 4, 1955 3 Sheets-Sheet 2
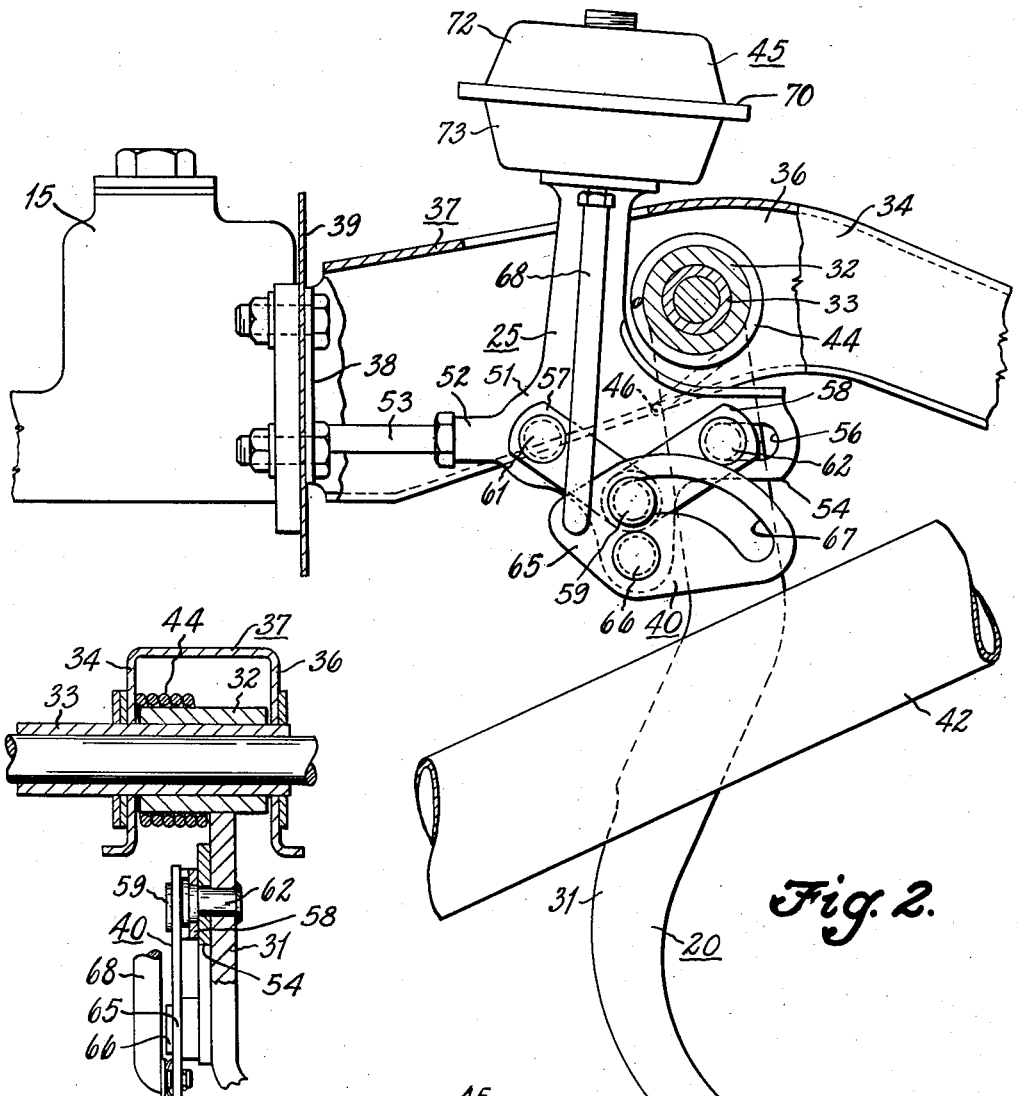
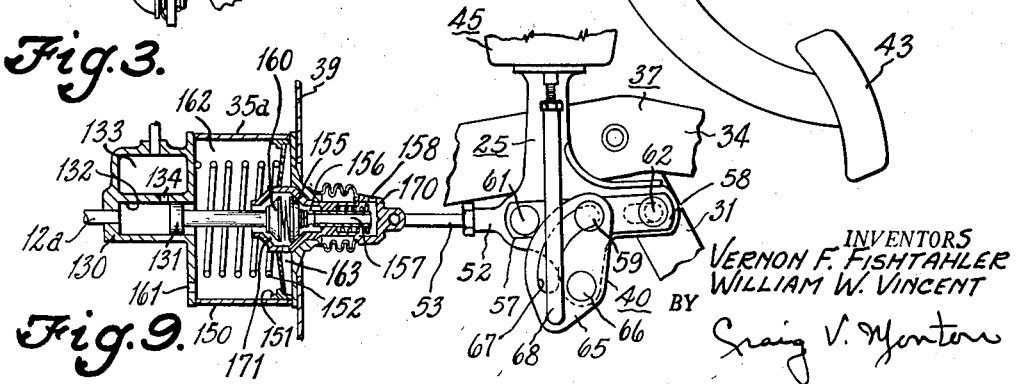
INVENTORS
VERNON F. FISHTAHLER
WILLIAM W. VINCENT
BY
Craig V. Monton
ATTORNEY Oct. 27, 1959 V. F. FISHTAHLER ET AL 2,910,147
HIGH-LOW BRAKE PEDAL LINKAGE
Filed April 4, 1955 3 Sheets-Sheet 3

INVENTORS
VERNON F. FISHTAHLER
WILLIAM W. VINCENT
BY
Craig V. Morton
ATTORNEY

United States Patent Office 2,910,147
Patented Oct. 27, 1959

2,910,147

HIGH-LOW BRAKE PEDAL LINKAGE

Vernon F. Fishtahler, Birmingham, and William W. Vincent, Detroit, Mich., assignors to General Motors Corporation, Detroit, Mich., a corporation of Delaware Application April 4, 1955, Serial No. 498,794

3 Claims. (Cl. 188—152)

This invention relates to brake mechanism particularly adapted for use on motor vehicles.

There is currently a definite trend incorporating power mechanisms on motor vehicles to aid in operating the vehicle brakes, and thereby relieve the operator of much of the effort required to actuate the brakes. Power actuated brake systems have taken several forms, but the most common in use today on passenger vehicles is that system wherein a vacuum powered actuating unit is operably connected with the fluid displacement device of a hydraulic brake system to power actuate the fluid displacement device. The power device itself is controlled by the operator of the vehicle upon manual operation of a brake pedal, suitable valving being provided in the power actuated device to regulate its action in response to movement of the brake pedal of the vehicle by the operator.

Since auxiliary powered brake systems require considerably less pedal effort on the part of the operator, the brake pedal can be positioned considerably lower relative to the floor of the vehicle so as to place it more nearly at the level of the accelerator pedal for the vehicle whereby the operator has more convenient foot movement from the accelerator pedal to the brake pedal. Such arrangements are in the interest of safety to provide a mechanical arrangement allowing for more rapid response of the operator in releasing the accelerator pedal and applying manual effort to the brake pedal. Also, the power operated brake systems require considerably less pedal effort so that full brake operation can be performed by the toe of the operator rather than by manual leg effort as heretofore required in the conventional type of non-powered brake system.

However, there are occasions when the power source for the auxiliary power for the brake system may fail, and under these circumstances it is desirable to have the brake pedal arranged so that a greater stroke of movement is effected for the brake pedal so that the operator can place more manual leg effort into the brake operation since at these times the failure of the power system will require direct manual operation of the brake system.

It is therefore an object of this invention to provide in a brake system having an auxiliary power mechanism to aid the manual operation of the brakes a brake pedal control mechanism by which the brake pedal is disposed in a low pedal position so long as a power source is effective for auxiliary power operation of the brake mechanism and is disposed in a high pedal position to provide greater displacement in the fluid displacement system of the brake system when the power source to the auxiliary power operating mechanism for the brake is ineffective.

Further objects and advantages of the present invention will be apparent from the following description, reference being had to the accompanying drawings wherein a preferred form of the invention is clearly shown.

In the drawings:

Figure 1 is an elevational view, partially in cross section, of a brake pedal positioning mechanism supported on a vehicle and including a schematic hydraulically operated brake system incorporating an auxiliary vacuum power operated power mechanism for aiding actuation of the brakes of the motor vehicle, the control mechanism for the brake pedal being illustrated with the pedal in high pedal position.

Figure 2 is an elevational view, partially in cross section, similar to Figure 1 but illustrating the brake pedal in low pedal position.

Figure 3 is a vertical cross sectional view taken along line 3—3 of Figure 1.

Figure 9 is a schematic view of another form of auxiliary power device for operating the brakes with which the brake pedal positioning mechanism can be operably associated.

Figure 1:
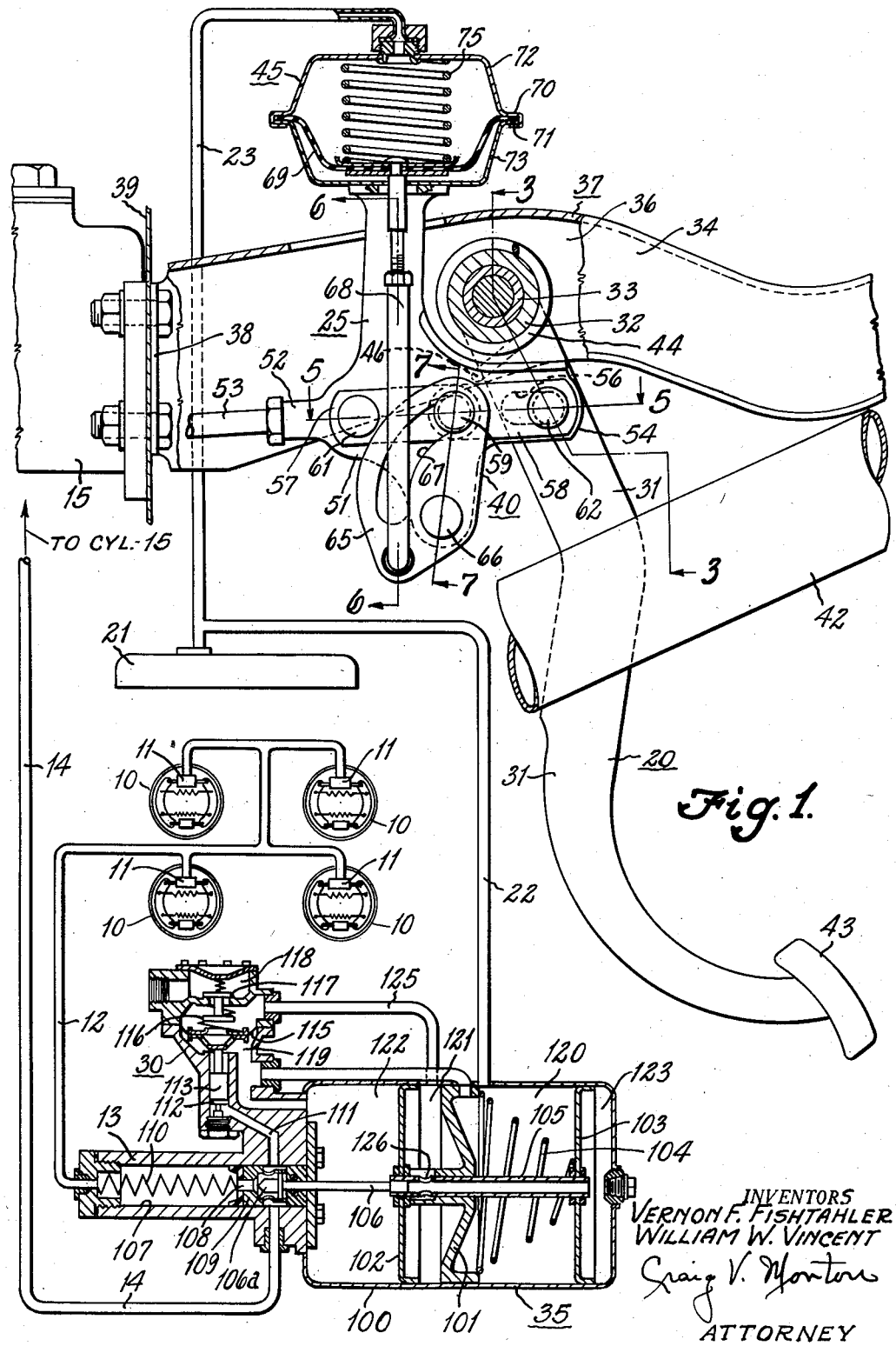
Figure 4:
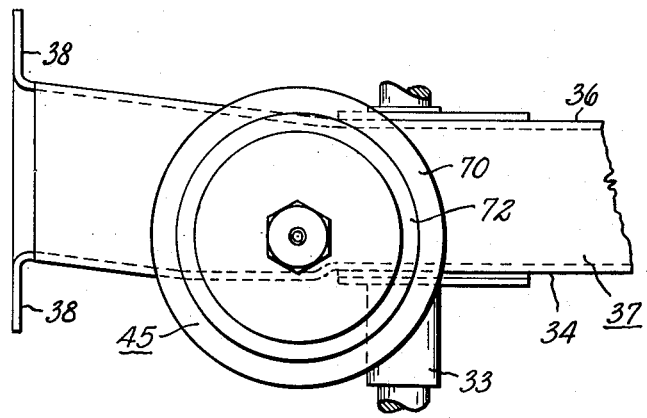
Figure 4 is a plan view of the mechanism illustrated in Figure 1.
Figure 5:
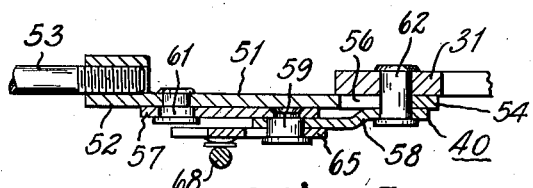
Figure 5 is a horizontal cross sectional view taken along line 5—5 of Figure 1.
Figure 7:
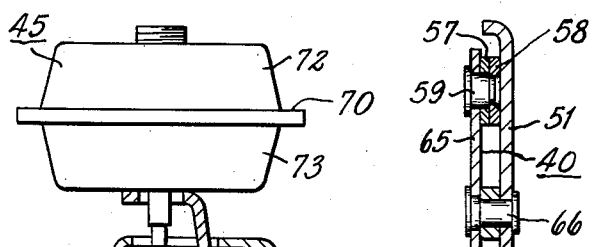
Figure 7 is a vertical cross sectional view taken along line 7—7 of Figure 1.

In Figure 1 there is illustrated schematically a hydraulic brake system for an automotive vehicle incorporating an auxiliary vacuum power operated brake booster unit adapted for effecting the major part of the brake effort under control of a manually operated brake pedal.

The brake system comprises a plurality of brakes 10 adapted for mounting at the wheels of a motor vehicle. Each of the brakes 10 includes a hydraulically operated wheel cylinder 11 for operating the respective brakes. The wheel cylinders 11 are supplied with hydraulic fluid under pressure from the system line 12 that is connected with a fluid displacement cylinder 13. The fluid displacement cylinder 13 is connected by a line 14 with a fluid displacement cylinder 15. In turn the fluid displacement cylinder 15 is operably connected with a brake pedal 20 through a force transmitting mechanism 25.

The fluid displacement cylinder 15 incorporates the usual piston therein for displacing fluid through the line 14 into the cylinder 13 upon actuation of the piston within the cylinder 15 by the brake pedal 20. Fluid displaced from the cylinder 15 enters the fluid displacement cylinder 13 to provide initial actuation of the wheel cylinders 11 and actuation of the control valve mechanism 30 that regulates operation of the vacuum powered brake booster unit 35. The vacuum powered brake booster unit 35 is connected with the manifold 21 of the engine of the motor vehicle by means of a vacuum line 22 that effects operation of the brake booster unit 35 in a manner hereinafter described.

The force transmitting mechanism 25 disposed between the brake pedal 20 and the fluid displacement cylinder 15 includes a brake pedal positioning mechanism 40 that is adapted to position the brake pedal 20 in either a high pedal position or a low pedal position, as hereinafter described.

The brake pedal positioning mechanism 40 is operably connected with a power actuating device 45 that controls the position of the brake pedal. The power actuating device 45 is also connected with the manifold 21 of the engine through a vacuum line 23. Thus the power actuating device 45 and the brake booster unit 35 are both connected to a common source of power, that is the manifold of the engine, so that when vacuum power is available, the power actuating device 45 and the brake booster unit 35 are rendered active to perform their specific intended functions. That is, when vacuum power is available as a result of operation of the engine of the vehicle on which the system is installed the brake booster unit 35 is available for auxiliary power operation of the brakes 10 under control of the brake pedal 20 as regulated by the valve 30. Also, the power actuating device 45 is activated so as to position the brake pedal 20 in a low pedal position as effected through operation of the brake pedal positioning mechanism 40 so long as the source of vacuum power is effective in the manifold 21 of the engine.

However, at any time the vacuum power in the manifold 21 of the engine is ineffective as a source of power, such as when the engine is stopped, the brake booster unit 35 is no longer effective as an auxiliary power unit for operating the brakes 10. At this time the power actuating device 45, having lost its source of vacuum power, will cause the brake pedal positioning mechanism 40 to move the brake pedal 20 to a high pedal position and thereby provide for a greater stroke of movement of the brake pedal, and thus greater fluid displacement from the fluid displacement device 15 for direct manual operation of the brakes 10, this latter being comparable to conventional fluid displacement operation of the hydraulic brake system having no auxiliary power operated brake actuating unit.

In more detail, the brake mechanism disclosed in Fig. 1 includes a brake pedal arm 31 attached to a sleeve 32 that in turn is supported upon a sleeve 33 extending through opposite side walls 34 and 36 of a support bracket 37. The support bracket 37 has the forward end 38 secured to the wall 39 that separates the engine compartment from the passenger compartment of a motor vehicle. The rear end 41 of the support bracket 37 is carried upon the support sleeve 42 for the steering column. The usual brake pedal pad 43 is carried on the lower end of the manually operable brake pedal arm 31. A torsion spring 44 has one end 46 engaging the arm 31 and the opposite end engages the support bracket 37 to normally position the brake pedal in a retracted position.

The brake pedal arm 31 is connected with the piston of the fluid displacement device 15 by means of a force transmitting member 51 that is generally T shaped in side elevation. The force transmitting member 51 has a forwardly extending arm 52 having a plunger 53 that extends into the fluid displacement device 15 for engagement with the piston therein to move the piston in the cylinder of the fluid displacement device. The force transmitting member 51 also has a rearwardly extending arm 54 that has a slot 56 therein.

A toggle joint formed of a pair of links 57 and 58 is mounted on the force transmitting member 51. The toggle links 57 and 58 have their ends connected together by a knee joint 59. One end of the toggle link 57 is pivotally mounted on the force transmitting member 51 by means of the pivot connection 61. The opposite end of the toggle joint, that is the link 58, has its end pivotally connected to the brake pedal arm 31 by means of a pivot connection 62 that is disposed in the slot 56 in the force transmitting member 51 whereby the opposite ends of the toggle joint 57, 58 are movable relatively.

Also, the toggle link 58 is connected with the brake pedal arm 31 by means of the pivot connection 62 so that movement of the pivot connection 62 in the slot 56 of the force transmitting member 51 effects movement of the brake pedal arm 31 about its pivot sleeve 33 to dispose the foot pedal pad 43 in a high pedal position illustrated in Fig. 1 or in a low pedal position illustrated in Fig. 2 depending upon the position of the pivot connection 62 in the slot 56 as controlled by the toggle joint 57, 58. When the toggle joint 57, 58 has the knee joint 59 linearly aligned with the pivot connections 61, 62 as illustrated in Fig. 1, the pivot connection 62 is in the right hand end of the slot 56 to dispose the brake pedal pad 43 in a high pedal position. With the mechanism in this mechanical arrangement, the manual effort applied to the brake pedal arm 31 will be applied directly through the toggle links 57, 58 to the pivot connection 61 of the toggle link 57 with the force transmitting member 51 and thereby to the plunger 53 for actuating the piston in the fluid displacement device 15.

However, when the toggle links 57 and 58 are in the position illustrated in Fig. 2 with the knee pivot 59 disposed out of alignment with the pivot connections 61 and 62, the pivot connection 62 being in the left hand end of the slot 56 in the force transmitting member 51, manual effort applied to the brake pedal arm 31 is transmitted directly to the force transmitting member 51 through the pivot connection 62 by its engagement with the left hand end of the slot 56. In this mechanical arrangement of the toggle joint 57, 58 the brake pedal pad 43 is in a low pedal position and is in a plane substantially common with the plane of an accelerator pedal of a motor vehicle so that an operator can shift his foot quickly from the accelerator pedal to the brake pedal 43.

The power actuating device 45 controls the operation of the toggle joint 57, 58 through means of the cam member 65 that is pivotally mounted on the force transmitting member 51 by means of a pivot connection 66. The cam member 65 has a cam slot 67 that receives the knee pivot 59 of the toggle joint 57, 58 whereby rotation of the cam member 65 clockwise about its pivot connection 66 will cause the knee pivot 59 of the toggle joint 57, 58 to move from the position shown in Fig. 1 to the position shown in Fig. 2 and thereby move the brake pedal from the high pedal position shown in Fig. 1 to the low pedal position shown in Fig. 2.

The cam member 65 is connected by means of a rod 68 with a diaphragm member 69 disposed in the power actuating device 45. The periphery of the diaphragm member 69 is retained between the annular flanges 70 and 71 of the container members 72 and 73 that form the power actuating device and provide a housing in which the diaphragm member 69 functions.

A compression spring 75 is positioned between the upper side of the diaphragm member 69 and the container member 72 whereby the diaphragm member 69 is urged to the downward position as shown in Fig. 1 when vacuum power of the manifold is not available. This action of the spring 75 causes the rod 68 to move the cam member 65 into the position shown in Fig. 1.

When vacuum power is available in the engine manifold 21, the effect of the compression spring 75 is overcome to raise the diaphragm member 69 upwardly whereby to cause the rod 68 to rotate the cam member 65 into the position shown in Fig. 2 and thereby place the brake pedal pad 43 in low pedal position so long as the vacuum power of the manifold 21 is available for actuation of the power actuating device 45.

Whenever vacuum in the manifold 21 fails, for any reason whatsoever, the spring 75 will return the diaphragm 69 to the position shown in Fig. 1 and thereby rotate the cam member 65 counter-clockwise to reposition the toggle joint 57, 58 in the position shown in Fig. 1, which is the high pedal position of the brake pedal.

Figures 6, 8:
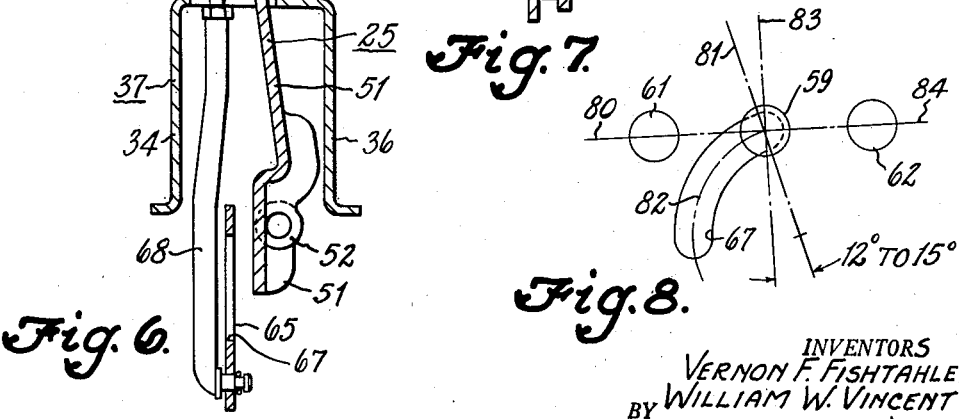
Figure 6 is a vertical cross sectional view taken along line 6—6 of Figure 1.
Figure 8 is a schematic view illustrating certain relationships between the pivot connections of the toggle link of the mechanism shown in Figure 1.

The cam slot 67 has a specially generated contour or arc of curvature by which the knee pivot 59 of the toggle joint 57, 58 is locked in the cam slot 67 in any position intermediate the extreme opposite ends of the cam slot. The purpose of this specially generated arcuate contour of the cam slot 67 is that in the event the source of vacuum from the engine manifold 21 should fail and the power actuating device 45 begin rotation of the cam member 65 in a counter-clockwise direction from the position shown in Fig. 2 to the position shown in Fig. 1, and concurrently a brake action be required by the operator of the vehicle, the force applied to the knee pin 59 of the toggle joint will effect a locking action in the cam slot 67 to prevent the knee pin 59 from slipping in the cam slot and cause a sudden drop of the brake pedal 43 to a low pedal position at a time when brake action is required and vacuum power has failed in the manifold for some reason which thereby eliminates also the auxiliary power actuation of the brake booster unit 35. As shown in Fig. 8, the cam slot 67 is disposed with reference to the line 80 through the pivot connections 61 and 62 of the toggle joint 57, 58 such that a line 81 drawn normal to the center line 82 of the slot forms an angle of from 12–15° with a line 83 drawn normal to the line 84 extending between the centers of the toggle link pivots 61 and 62. This specific arrangement is such that the knee pivot pin 59 of the toggle joint will lock in the cam slot 67 in any position intermediate extreme opposite ends of the cam slot whenever pressure is applied to the movable pin 62 of the toggle joint. This provides for braking force to be applied to the force transmitting member 51 from the brake pedal arm 31 irrespective of any emergency condition that might arise during a time interval when the brake pedal is being changed between its selective positions illustrated in Figures 1 and 2.

The vacuum power operated brake booster unit 35 illustrated in Fig. 1 is one of several conventional types of auxiliary power units adapted for use with hydraulic brake systems to effect power operation of the brakes of the vehicle in response to manual actuation of the brake pedal. There are other forms of vacuum power operated brake boosters that will perform their desired operation in connection with the brake system, and in connection with the brake pedal height control mechanism shown in Figures 1 and 2, another form of mechanism being illustrated in Fig. 9.

In the auxiliary power operated mechanism 35 shown in Fig. 1, the booster unit 35 comprises a cylinder 100 having a stationary wall 101 therein. Pistons 102 and 103 reciprocate in the cylinder 100 and they are normally urged to the position shown in Fig. 1 by means of the compression spring 104. The pistons 102 and 103 are interconnected by a hollow tube 105 that has a plunger 106 extending forwardly into the cylinder chamber 107 of the fluid displacement device 13. The forward end of the plunger 106 has a valve member 106 adapted to close the port opening 108 in the piston 109 that is reciprocable in the cylinder chamber 107. The piston 109 is normally urged to the position shown in Fig. 1 by means of the compression spring 110.

The fluid displacement device 15 that is operated directly by the brake pedal 20 displaces fluid through the line 14 into the cylinder chamber 107 behind the piston 109 and through the passage 111 to the control chamber 112 having a piston 113 therein.

When the brake pedal 20 is actuated and fluid is displaced from the fluid displacement device 15, the displaced fluid enters the displacement device 13 on the right hand side of the piston 109 and flows through the port 108 to the wheel cylinders 11 through the hydraulic line 12 and also flows through the line 111 to the control piston 113.

The control piston 113 operates the diaphragm valve member 115 so as to close against the valve member 116 and to open the valve member 117.

The valve member 117 controls flow of atmospheric air pressure from the chamber 118 while the valve 116 controls flows of vacuum from the chamber 119.

With the control valve disposed in the position shown in Fig. 1 vacuum from the manifold 21 stands in the chambers 120, 121, 122 and 123 whereby the pistons 102 and 103 are disposed in the position illustrated in Fig. 1.

When the fluid displaced from the fluid displacement device 15 actuates the piston 113 of the control valve 30, the valve member 116 closes upon the diaphragm member 115 to close off the vacuum source between the chamber 119 in the control valve and the chamber 121 in the brake booster unit 35. Slight additional movement of the combination valve 116, 117 effects opening of the valve 117 to provide for atmospheric air to enter chamber 121 from the chamber 118 of the valve through the conduit 125. Also, atmospheric air passes through the opening 126 in the hollow tube 105 through the central portion thereof into the chamber 123 thereby causing the pistons 102 and 103 to advance.

Initial advancement of the pistons 102 and 103 close valve 106a in the port passage 108 to prevent further fluid displacement from the fluid displacement device 15 into the left hand end of the cylinder chamber 107 of the fluid displacement device 13. Continued forward advancement of the pistons 102 and 103 from this point on causes fluid displacement from the cylinder chamber 107 under power actuation of the pistons 102 and 103. Concurrently, the fluid displaced from the fluid displacement device 15 is acting on the control piston 113 to regulate the position of the combination valve 116, 117 for supply of vacuum to the brake booster unit 35 or supply of air thereto to regulate the rapidity of forward advancement of the pistons 102 and 103, all of which operation of the brake booster unit is well-known in the art.

From the foregoing description it is obvious that so long as vacuum power is available in the engine manifold 21, and thus to the auxiliary power source comprising the brake booster 35, that the power actuating device 45 will hold the brake pedal 20 in the low pedal position illustrated in Fig. 2 so that a minimum of movement will be required to actuate the brakes of the motor vehicle.

Anytime vacuum power fails to the auxiliary power unit or brake booster unit 35, it will concurrently fail to the power actuating device 45 and thereby permit the spring 75 of the power actuating device 45 to actuate the brake pedal positioning mechanism 40 to move it from the position shown in Fig. 2 to the position shown in Fig. 1 to raise the brake pedal to a high pedal position and thereby give added stroke to the brake pedal mechanism and provide for greater movement of the piston in the fluid displacement device 15 for additional displacement of the fluid from the fluid displacement device 15 into the brake system line 12 for actuation of the brakes, the valve 106a being inactive as a result of power failure to the brake booster 35 so that the port opening 108 is continuously open to receive the full discharge from the fluid displacement device 15 for direct hydraulic actuation of the wheel cylinders 11 of the brakes 10.

In Fig. 9 there is illustrated another form of auxiliary power unit for power actuation of the brakes of the motor vehicle, this device also being operated by vacuum power from the manifold of the engine. In the device of Fig. 9, there is provided a fluid displacement device 130 having a piston 131 reciprocable in the cylinder chamber 132. The conduit 12a connects with the wheel cylinders 11 of the brakes in the same manner as illustrated in Fig. 1. A fluid reservoir 133 communicates with the chamber 132 through the port opening 134 in conventional manner.

The auxiliary power unit, or brake booster unit 35a comprises a shell 150 having a piston 151 therein normally retained in the position illustrated in the drawing by means of the compression spring 152. A valve member 155 closes the chamber 156 and the port passage 157 against entry of air from the atmospheric air inlet line 158. Normally, the valve 160 is in the open position, as shown, so that the vacuum inlet line 161 supplying vacuum to the chamber 162 connects with the chamber 163 on the opposite side of the piston 151.

When the valve casing member 170 is moved forward by means of the actuating rod 53 from the power transmitting device 25, the passage 157 is closed and valve 160 engages its seat to close the passage 171. Shortly thereafter valve 155 is lifted from its seat to allow air to enter from the inlet 158 into the chamber 163 for power advancement of the piston 151 in a left hand direction.

Thus, the fluid displacement device 130 is capable of operation directly from the brake pedal 20 and is power actuated by the auxiliary power device 35a. Operation of the mechanism in combination with the brake pedal 20 is the same as heretofore described with reference to Fig. 1.

In either instance it will thus be seen that so long as the auxiliary power operated device has a source of power available for actuation of the auxiliary brake booster, the brake pedal will be retained in its low pedal position by the brake pedal positioning mechanism 40, and whenever power fails to the auxiliary power actuating device, the brake pedal 20 will automatically be positioned in a high pedal position to take advantage of greater leverage for manually actuating the brakes.

While the form of embodiment of the invention as herein disclosed constitutes a preferred form, it is to be understood that other forms might be adopted as may come within the scope of the claims which follow.

What is claimed is as follows:

1. Vehicle brake mechanism, including in combination, fluid actuated brake means, fluid displacement means operably connected with said brake means to actuate the same, manually operated brake pedal means operably connected with said fluid displacement means to effect operation thereof, auxiliary power means operably connected with said fluid actuated brake means to aid in power operation thereof, said operable connection between the manually operated brake pedal means and the fluid displacement means including a force transmitting mechanism, said force transmitting mechanism comprising a force transmitting member connected to said fluid displacement means to actuate the same, linkage means forming a toggle joint having a knee pivot, means pivotally mounting one end of said toggle joint on said force transmitting member, a slot in said force transmitting member, means pivotally mounting the opposite end of said toggle joint with the pivot means slidable in said slot for movement of the said opposite end relative to the force transmitting member, said pivot means connecting said movable end of said toggle joint with said brake pedal to effect spatial positioning of said brake pedal in a high pedal position when said toggle joint is in extended position and to dispose said brake pedal in a low pedal position when said toggle joint is in a contracted position, cam means pivotally mounted on said force transmitting member and having opposed surfaces engaging said knee of said toggle joint to effect extension and contraction of the said toggle joint on rotation of the cam means, a second power actuated means connected to said cam means to effect rotation thereof to actuate said toggle joint to contract the same and dispose said brake pedal in said low pedal position so long as said second power actuated means connected to said cam means is power effective, and other means operably connected with said cam to rotate the same to effect extension movement of said toggle joint to position said brake pedal in said high pedal position when said power actuated means is ineffective, the contour of said surfaces of the cam means being such that when force is applied to said brake pedal and said power actuated means is ineffective said knee pivot is locked in any position intermediate the opposite ends of the cam.

2. Vehicle brake mechanism in accordance with claim 1 in which said surfaces of said cam means define a slot engaging the knee of the toggle joint and are generated such that a line normal to the generated cam surfaces forms an angle with a line normal to a line between the end pivot means of the toggle joint to effect said locking of the knee pivot.

3. Vehicle brake mechanism in accordance with claim 2 in which said line normal to the generated cam surfaces forms an angle of from 12° to 15° with the line normal to a line between the end pivot means of the toggle joint.

References Cited in the file of this patent

UNITED STATES PATENTS

| | | |
|---|---|---|
| 2,037,869 | Wall | Apr. 21, 1936 |
| 2,365,960 | Ingres | Dec. 26, 1944 |
| 2,706,020 | Freers et al. | Apr. 12, 1955 |